Figure 6:
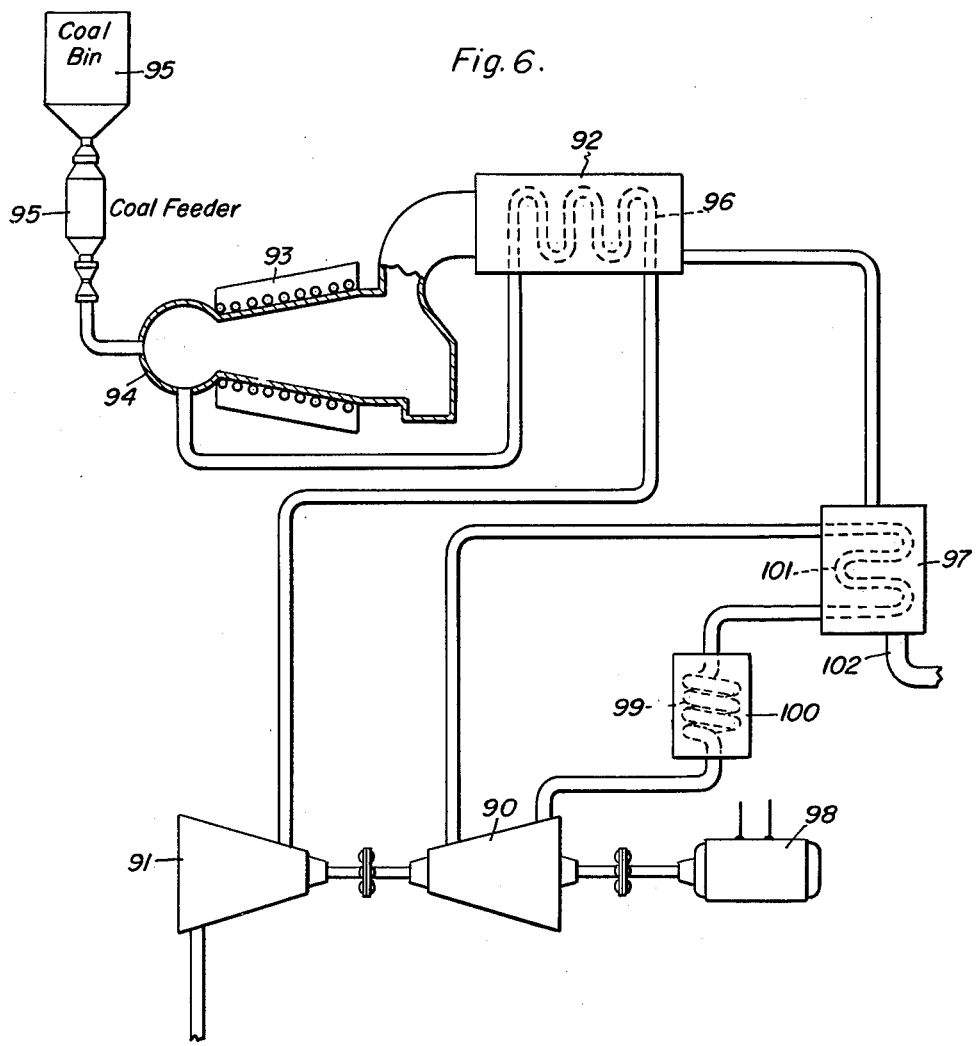

Sept. 15, 1964  J. D. COBINE ETAL  3,149,247
MAGNETOHYDRODYNAMIC GENERATOR CONFIGURATION
Filed Oct. 6, 1960  3 Sheets-Sheet 1
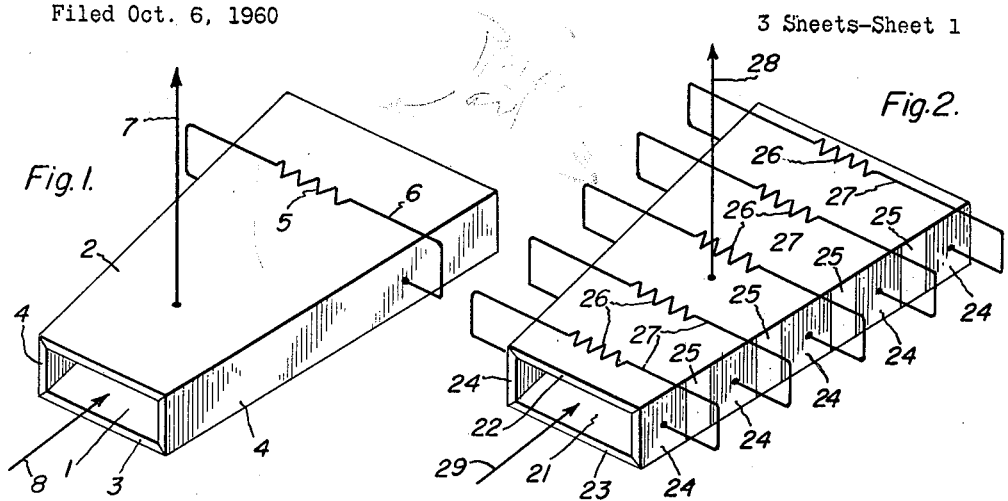
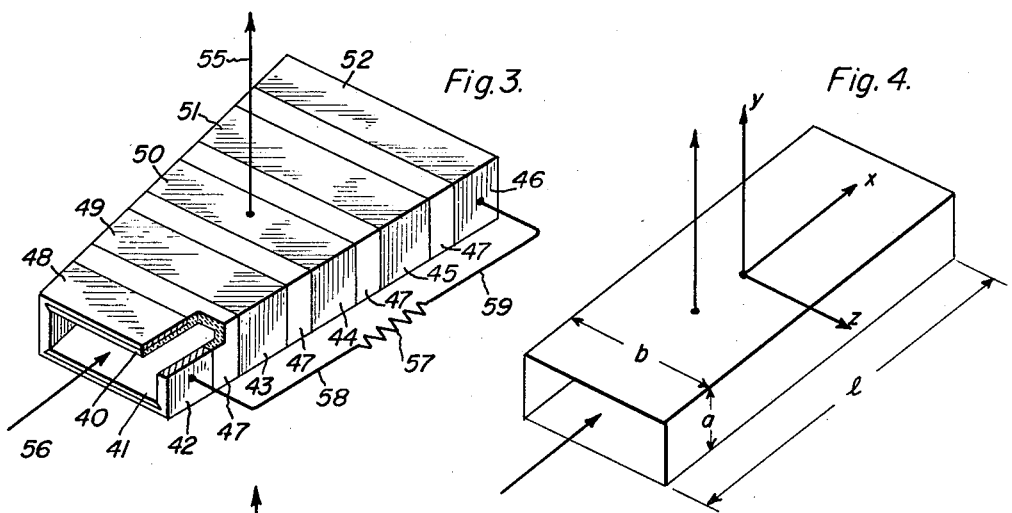
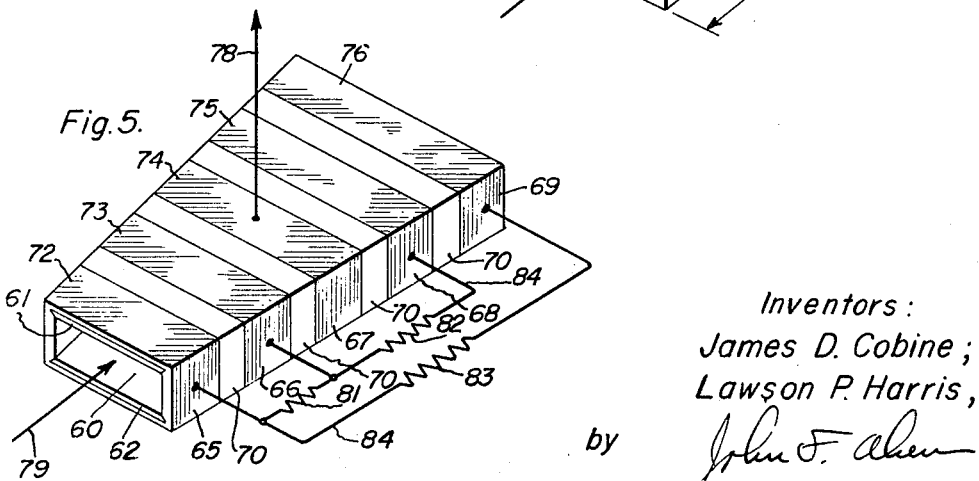
Inventors:
James D. Cobine;
Lawson P. Harris,
by
Their Attorney.

Inventors:
James D. Cobine;
Lawson P. Harris,
by
Their Attorney.

Sept. 15, 1964   J. D. COBINE ETAL   3,149,247
MAGNETOHYDRODYNAMIC GENERATOR CONFIGURATION
Filed Oct. 6, 1960   3 Sheets-Sheet 3

Inventors:
James D. Cobine;
Lawson P. Harris,
by John F. Ahern
Their Attorney.

United States Patent Office
3,149,247
Patented Sept. 15, 1964

3,149,247
MAGNETOHYDRODYNAMIC GENERATOR
CONFIGURATION
James D. Cobine, Rexford, and Lawson P. Harris, Schenectady, N.Y., assignors to General Electric Company, a corporation of New York
Filed Oct. 6, 1960, Ser. No. 60,994
4 Claims. (Cl. 310—11)

This invention pertains to a method and apparatus for generating electrical power, and more particularly, to a method and apparatus for generating electrical power through the interaction of a moving conducting fluid and a magnetic field.

Present day methods for generating electrical power usually include a means for increasing the thermal energy of a fluid such as steam or combustion gases and means for the subsequent conversion of this energy to electrical energy. This conversion utilizes an intermediate step, that is, the conversion of the thermal energy to mechanical energy before conversion to electrical energy. This mechanical step in the production of electrical energy requires expensive equipment, such as turbines, and also reduces the efficiency of the conversion of heat to electrical energy. In an attempt to eliminate the conversion to mechanical energy, and thus make possible the direct conversion of heat energy to electrical energy, it has been proposed that a heated, conductive fluid be passed through a magnetic field and the electrical currents generated in the fluid be removed for utilization in an electric load circuit. The science dealing with the interaction of a conducting fluid with a magnetic field is usually referred to as magnetohydrodynamics and is abbreviated MHD. Thus, direct conversion of heat to electrical energy is facilitated; however, certain practical limitations have prevented the utilization of this type of direct conversion on a commercial basis.

In existing MHD electrical generator configuration, a partially conducting fluid as, for example, an ionized gas, is forced through a channel in a magnetic field which is transverse to the direction of fluid flow. The electric current generated by the interaction of the ionized gas with the magnetic field flows transverse to both the fluid direction and the magnetic field direction. In most prior art devices, it is this transverse electric current, which is tapped from the fluid flow channel by means of electrodes in the channel and delivered to an external electric load, that provides the useful output of the MHD generator. One of the major difficulties encountered in an MHD configuration, such as the one described, is the existance of an axial electric current flowing in the direction of the fluid flow. The axial current flow is one manifestation of an effect known as the Hall effect. Briefly stated, the Hall effect is the phenomenon evidenced, in a conducting medium subjected to a magnetic field, by a lack of parallelism between the vector components of electric field and current density in the plane perpendicular to the magnetic field. The angle between these vector components is determined by the characteristics of the medium and the magnetic flux density. The current component perpendicular to both electric and magnetic fields is denominated as the "Hall current." This Hall current, since it is axial in an MHD channel, has often been thought to be a total loss to the power generation of an MHD generator and was therefore generally considered a necessary and inherent disadvantage to this method of energy conversion. In instances where it has been sought to be utilized, instabilities have rendered the extraction of useful power a highly inefficient process.

It is therefore an object of the invention to provide an MHD electrical power generator which eliminates the undesirable aspects caused by Hall effect currents.

It is a further object of the invention to provide an MHD generator having a higher voltage output for a given power rating.

It is a further object of the invention to provide an MHD generator which utilizes the Hall effect current to supply an external load without loss of power due to instability.

It is still another object of the invention to provide an MHD generator having greater flexibility than generators of the similar type in the prior art.

Briefly stated, in accordance with one aspect of the invention, a magnetohydrodynamic generator includes a fluid flow channel having a rectangular cross-section. The channel is provided with segmented electrodes spaced at intervals along the direction of fluid flow. Each electrode has a corresponding electrode placed across the fluid flow channel to form an electrode pair. Each pair of electrodes is electrically connected by solid conducting material to complete a current path for the transverse electric current generated by the passage of an ionized fluid through the magnetic field. The Hall current generated axially by the transverse electric current existing in the fluid is utilized to supply an electric load by connecting the load between selected axially displaced electrodes. The current in the shorting conductors provides the resistance to fluid flow, and thus establishes the desired pressure gradient for the conversion of the energy contained in the fluid to electrical energy. The Hall current, flowing parallel to the direction of fluid flow, is then utilized to supply an external electric load.

Figure 7:
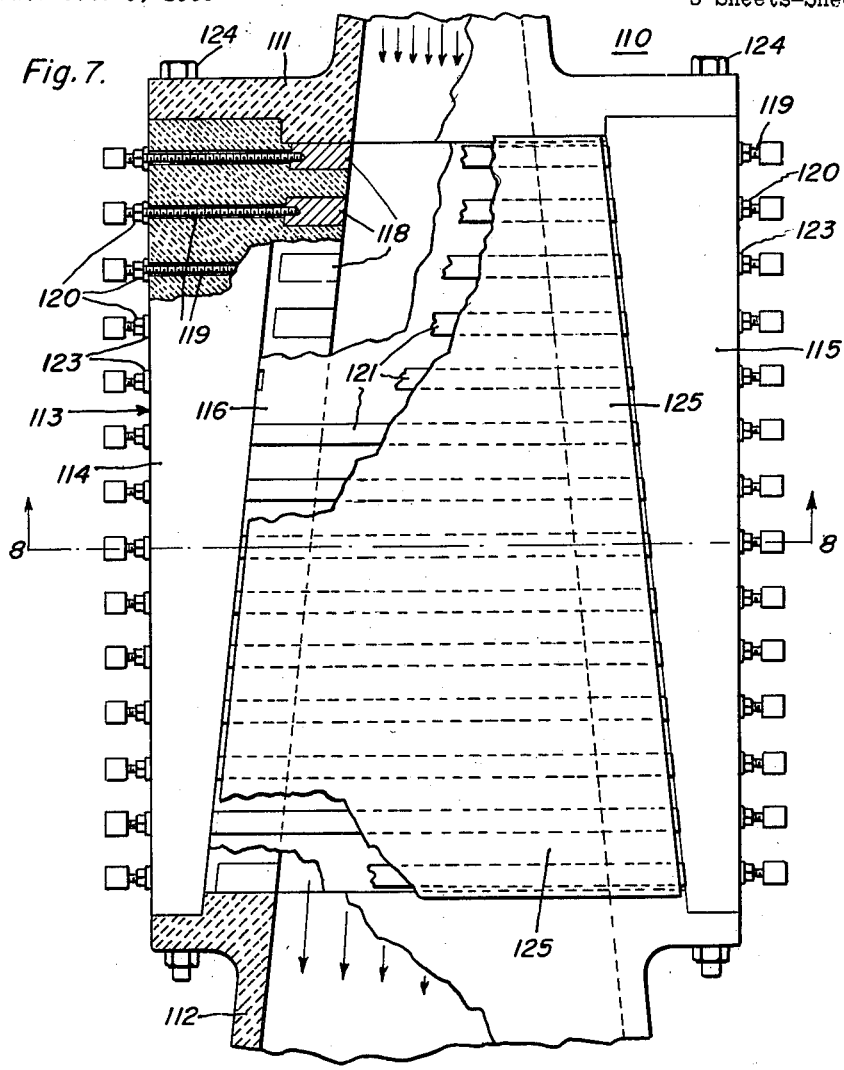
Figure 8:
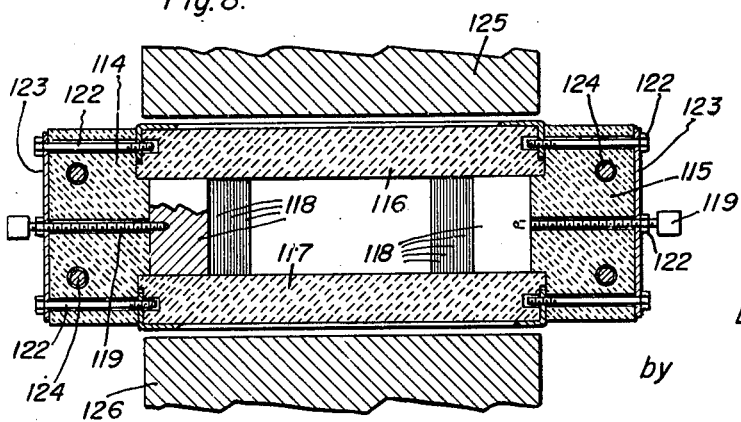

The invention both as to its organization and operation together with further objects and advantages thereof may best be understood by reference to the following description taken in connection with the accompanying drawings in which:

FIGS. 1 and 2 show common prior art MHD generator channel configurations,

FIG. 3 shows an MHD generator channel configuration incorporating the teachings of the present invention, FIG. 4 shows a generalized form of an MHD generator channel having coordinates superimposed thereon for purposes of analysis, FIG. 5 shows a modification of the MHD generator channel of FIG. 3, FIG. 6 is a schematic illustration of a complete power plant system utilizing an MHD generator, FIG. 7 is a horizontal view, with parts in section, of the specific structure of one MHD channel constructed in accord with the present invention, and FIG. 8 is a vertical cross-sectional view taken along section line 8—8 in FIG. 7.

In order to facilitate an understanding of the present invention, prior forms of MHD generators will first be described in some detail in connection with FIGS. 1 and 2 of the drawings.

Referring to FIG. 1, a generalized MHD generator configuration having a channel 1 is shown. The generator includes a tapered box-like structure having a top 2 and bottom 3 of insulating material. The sides of the generator are of conducting material 4 which form electrodes. An external electrical load 5 is connected between the electrodes 4 by means of conductor 6 thereby providing a completed circuit for the flow of electric current. A magnetic field having the direction shown by the arrow 7 is established by any suitable means (not shown). A conducting fluid is forced to flow through the generator in the direction indicated by the arrow 8.

Briefly stated, the operation of the device of FIG. 1 is as follows. An ionized fluid, such as a gas stream which has been heated to a temperature at which it becomes partially ionized, is pumped through the channel formed by the two electrodes and the two insulator sides of the MHD generator. The interaction of the ionized gas stream with the magnetic fields existing transverse to the flow of the stream causes an electromotive force to be generated in the gas. Under the influence of this electromotive force, the charged particles of the gas are caused to flow transverse to the direction of the magnetic field lines of flux and the direction of fluid flow, that is, from one side of the MHD generator channel to the other. By electrically connecting an external load to the conducting sides of the channel, a completed electrical path is provided which thereby permits an electric current to flow through the load. The interaction between the ionized particles and the magnetic lines of flux, which causes the electric current generation, produces a resistance to the flow of the ionized gas through the MHD generator channel. This resistance to the flow of the ionized gas must therefore be overcome by a pressure differential between the entrance and exit of the MHD generator channel. The MHD generator channel may be tapered as shown to permit expansion of the gases flowing therethrough. It may therefore be seen that combustion gases, already partially ionized because of their respective temperatures, and preferably seeded by a low ionization potential impregnant, being at a high pressure may be utilized directly to convert the energy contained therein to electrical energy by allowing the gas to flow through the MHD generator. The conversion of thermal energy to mechanical energy prior to its conversion to electrical energy is therefore avoided.

One of the most serious problems encountered with an MHD generator configuration such as that shown in FIG. 1, is the existence of an axial current in the channel. This current is parallel to the fluid flow and its return path is through the electrodes 4. The transverse electric currents produced in the ionized gas may be thought of as a current in a plane at right angles to a magnetic field. Therefore, the prerequisites for establishment of a Hall current are met, and an axial current, or Hall current, will flow. Since the Hall current is axial to the electrodes no useful purpose is served, and, in the ordinary MHD generator configuration, these currents merely complicate the already serious electrode problems such as, for example, current saturation of the electrodes at the respective ends of the channel, and cause a decrease in the effective conductivity of the working fluid.

The ratio of axial current density to the transverse current density within this type MHD generator channel is given by the quantity $\beta_e$ which may be defined $$\beta_e = \frac{\text{electron cyclotron radian frequency}}{\text{electron collision frequency}}$$

For a working gas comprising air-like combustion gases $\beta_e$ is approximately (1) $$\beta_e = .04 \frac{B\sqrt{T}}{P}$$

where B is the magnetic flux density in webers per square meter, T is the absolute temperature in degrees Kelvin, and p is the gas pressure in atmospheres. For other types of working gases, such as inert gases, the numerical factor in Equation 1 may be larger by as much as a factor of 50.

A related phenomenon arises in this device because the electric field generated in the gas is proportional to the applied magnetic field. Once the magnetic field is sufficiently large that $\beta e \gtrsim 1$, increasing the magnetic field increases the generated voltage, but actually decreases the load current at such a rate that the electrical power output remains nearly constant. When this condition is achieved, the incremental magnetic fields, provided at considerable expense, are very poorly used. For this reason, the maximum practical magnetic field strength for the device shown in FIG. 1 is that for which $\beta e \approx 1$. Equation 1 indicates, for example, that a generator using combustion gases at a generator pressure of about two atmospheres and temperatures of 2000–2500 degrees Kelvin could not effectively use magnetic fields exceeding 10,000 gauss. Therefore, the generated electric field and the power density are limited by these factors.

To combat the problem of Hall effect current, the prior art MHD generator configuration of FIG. 2 has been suggested. In FIG. 2, an MHD generator configuration having a channel 21 is shown having a rectangular cross-section with the top 22 and bottom 23 of insulating material. The sides of the generator comprise conductive strips 24 separated by insulating spacers 25. Each conductive strip 24 is electrically connected through a load 26 by means of a conductor 27 to the conductive strip directly opposite the channel from the strip. A magnetic field is established in the direction of the arrow 28 by any suitable means (not shown), and the partially ionized gas is caused to flow through the channel in the direction of the arrow 29.

The operation of the MHD generator configuration of FIG. 2 is similar to that of the generator of FIG. 1; however, it will be noted that the axial or Hall currents are limited since the electrodes are segmented into a series of relatively narrow strips. The segmented electrode configuration allows a Hall voltage to exist axially along the channel, but prevents an axial Hall current path by thereby dividing the electrical load into sub-loads—one for each pair of electrode segments. The axial electric current will flow only until it builds up an axial space-charge field that stops it, and the transverse load current will constitute the total generator current in the steady state. It may be seen that the Hall currents have been substantially eliminated, therefore alleviating the difficulties caused by the resultant axial currents in the electrodes. However, to eliminate the effects of the Hall currents, it is necessary to utilize a series of small electric loads rather than a single load. It will be noted, that the configuration of FIG. 2, requires the individual loads 26 to be connected between respective opposing electrodes 24. Therefore, the utilization of an MHD generator configuration of FIG. 2 requires the division of the load into electrically isolated sub-loads; in a practical MHD generator of this type, as many as 20 to 50 of these sub-loads may be required. While this is not objectionable in all applications, it is not universally acceptable.

In the generator configuration of FIG. 2, the Hall effect is not utilized; it is rendered harmless. It is, however, an object of the present invention to utilize the Hall effect to produce useful power. This has been attempted in the prior art. Thus, for example, in U.S. Patent 2,210,918 to Karlovitz the Hall current is sought to be utilized to produce useful power. The Karlovitz generator, however, utilized an annular flow channel which, for a number of reasons render this device of no practical utility for the extraction of useful power. Thus, the use of the annular flow channel permits the forces upon the ionized fluid to cause a swirling motion which is limited only by fluid and wall friction. This swirling tends to diminish, and in the extreme case eliminate, lateral pressure differential without which a Hall current cannot be generated. Viewed from another aspect, the lateral motion of the fluid causes the generation of an axial voltage within the channel which voltage opposes and diminishes the Hall voltage and tends to minimize the possibility of extracting useful power due to Hall currents.

In addition to the foregoing, fundamental defect of the annular configuration for a Hall effect generator, there are other practical disadvantages which render this configuration poor for practical operation. Thus, the utilization of a central magnetic core is impractical, for it subjects the core material to temperatures above which its magnetic properties are dissipated. Intricate and elaborate cooling schemes must therefore be devised. Additionally, there exists the problem of replenishing the electrodes. As is well known in the art, the high temperatures necessary for operation of an MHD device cause rapid deterioration of the electrodes thereof, and, to avoid the necessity of shutting the device down, it must be possible to continuously replenish the electrodes. This is an extremely difficult, if not impossible, task in an annular configuration.

FIG. 3 shows an MHD generator embodying the teachings of the present invention. In FIG. 3, an MHD generator is shown having a top 40 and bottom 41 of insulating material. This material must be refractory and may conveniently be an oxide of zirconium, thorium or aluminum. The sides of the generator include conductive strips 42–46, which may conveniently be of carbon, separated by insulating spacers 47, of the same material as elements 40 and 41. Each of the conductive strips 42–46 is electrically connected to its respective opposing electrode across the channel by conductive bars 48–52 which need not be exposed to the working fluid and which may be metallic. A magnetic field is established, having a flux in the direction of the arrow 55, by any suitable means (not shown). This means may conveniently comprise a suitable magnetic core and field winding, well known to the art. The ionized fluid is forced to flow through the MHD generator channel in the direction of the arrow 56. An electric load 57 is connected by means of conductors 58 and 59 to electrodes 42 and 46.

The ionized gas flowing in the direction of the arrow 56, by interaction with the transverse magnetic field, causes an electric current to flow from each electrode to its opposed electrode, the circuit being completed by the conductive bars. The current flowing in the ionized gas produces the necessary resistance to flow, thereby establishing a pressure gradient in the channel. Since the electrodes are segmented in the axial direction, no Hall effect currents are permitted to flow with the exception of the current flowing through the load. The load 57 is shown connected between electrodes 42 and 46; however, depending on the voltage desired, a load may be connected between any pair of electrodes separated in the axial direction. Therefore, the Hall effect current is changed from merely an unwanted consequence of MHD generation to a characteristic which is utilized for the efficient production of electrical energy. The electrode difficulties caused by the Hall effect currents are eliminated, and the MHD generator is permitted to feed a single load.

The relations between current densities and electric fields in any of the three generators of FIGS. 1, 2, or 3 can be summarized in the matrix form:

$$\begin{bmatrix} J_x \\ J_y \\ J_z \end{bmatrix} = \sigma_{oe} \begin{bmatrix} \frac{1+\beta_i\beta_e}{1+\beta_e^2} & 0 & \frac{\beta_e}{1+\beta_e^2} \\ 0 & 1 & 0 \\ \frac{-\beta_e}{1+\beta_e^2} & 0 & \frac{1+\beta_i\beta_e}{1+\beta_e^2} \end{bmatrix} \begin{bmatrix} E_x \\ E_y \\ E_z + vB \end{bmatrix} \quad (2)$$

where J and E are the current density and electric field, v and B are the fluid velocity and magnetic flux density, $\sigma_{oe}$ is the electronic conductivity in the absence of magnetic fields, $\beta$ represents the ratio $$\beta = \frac{\text{cyclotron radian frequency}}{\text{collision frequency}}$$

and the subscripts $e$ and $i$ refer to electrons and ions, respectively. Equation 2 applies to a gas in which the important collisions are electron-neutral collisions, the electron and ion collision frequencies are independent of energies, and the $\beta$ factors satisfy the inequalities and $$\beta_e \gg \beta_i$$
$$1 \gg \beta_i$$

The flow is in the $x$-direction, and the magnetic field is in the $y$-direction.

If the generator channel is approximated by the rectangular prism of height $a$, width $b$, and length $l$, as indicated in FIG. 4, and if any distortion in the currents and voltages within the channel caused by the finite size of electrode segments is neglected, and any effects of interelectrode electrical leakage through flow boundary layers are neglected, then the differences between the three generators can be summarized in terms of constraints on the current and electric field components. These constraints are:

Generator FIG. (1):
$$J_y = 0, E_x = 0$$

Generator FIG. (2):
$$J_y = 0, J_x = 0 \quad (3)$$

Generator FIG. (3):
$$J_y = 0, E_z = 0$$

When the constraints of Equation 3 are used in Equation 2 to compute open-circuit voltages $V_{oc}$ and short-circuit currents $I_{ss}$ obtainable at the load terminals, and the restrictions on the magnitudes of the $\beta$ factors are considered, the results obtained are:

Generator FIG. (1):

$$V_{oc} = vBb, \quad I_{ss} = \frac{1+\beta_i\beta_e}{1+\beta_e^2} \cdot \sigma_{oe} vBal$$

Generator FIG. (2):

$$V_{oc} = vBb, \quad I_{ss} = \frac{\sigma_{oe} vB}{1+\beta_i\beta_e} al$$

Generator FIG. (3):

$$V_{oc} = \frac{\beta_e vBl}{1+\beta_i\beta_e}, \quad I_{ss} = \frac{\sigma_{oe}\beta_e vB}{1+\beta_e^2} ab$$

if $\sigma_{oe}$, $\beta_i$, $\beta_e$, $v$, and B are constants within the generators. Thus the open-circuit voltage ratios are $$\frac{V_{oc}(3)}{V_{oc}(1)} = \frac{V_{oc}(3)}{V_{oc}(2)} = \frac{\beta_e}{1+\beta_i\beta_e} \frac{l}{b}$$

which might easily be a ratio of 25 to 50 if $B_e$ is between 2 and 5. The corresponding ratios of short-circuit currents are $$\frac{I_{ss}(3)}{I_{ss}(1)} = \frac{\beta_e}{1+\beta_i\beta_e} \frac{b}{l}, \quad \frac{I_{ss}(3)}{I_{ss}(2)} = \frac{(1+\beta_i\beta_e)}{1+\beta_e^2} \frac{b}{l}$$

The output powers P per unit channel volume are:

Generator FIG. (1):

$$P = \frac{1+\beta_i\beta_e}{1+\beta_e^2} \sigma_{oe} V^2 B^2 n(1-n)$$

Generator FIG. (2):

$$P = \frac{1}{1+\beta_i\beta_e} \sigma_{oe} V^2 B^2 n(1-n)$$

Generator FIG. (3):

$$P = \frac{\beta_e^2}{(1+\beta_e^2)(1+\beta_i\beta_e)} \sigma_{oe} V^2 B^2 n(1-n)$$

where $n$ is the ratio $$\frac{\text{operating load voltage}}{\text{open-circuit load voltage}}$$

a number in the range $0 < n < 1$.

For similar conditions of channel size, gas flow, and output, the output voltage of the generator shown in FIG. 3 can be 10 to 100 times greater than that of previous MHD generator configurations such as shown in FIGS. 1 and 2. The generator of FIG. 1 has one pair of output terminals but is subject to the disadvantage of axial currents as noted previously; the generator of FIG. 2 must have many pairs of output terminals. The generator of FIG. 3, incorporating the teachings of the invention, may have one or many pairs of output terminals chosen according to the desired output voltage, and may utilize common or separate electrodes for a plurality of loads.

In FIG. 5, a modification of the MHD generator of the invention described in connection with FIG. 3 is shown. An MHD generator configuration having a channel 60 is shown with a rectangular cross-section having the top 61 and a bottom 62 of insulating material. The sides of the generator include conductive strips 65-69 separated by insulating spacers 70. Each of the conductor strips 65-69 is electrically connected to its respective opposing electrode across the channel by conductive bars 72-76. A magnetic field is established, having a flux in the direction of the arrow 78, by any suitable means (not shown). An ionized fluid is forced to flow through the MHD generator channel in the direction of the arrow 79. Electric loads 81, 82 and 83 are connected to selected electrodes by means of conductors 84. It may be noted, that in the modification shown in FIG. 5, the load 81 is connected between electrodes 65 and 66, whereas, load 82 is connected between electrodes 66 and 68, and load 83 is connected to electrodes 65 and 69. Further, it may be noted that the loads may be joined to a common electrode, that is, they need not be electrically insulated from one another. The flexibility provided by the MHD generator configuration of the present invention is obvious; any combination of voltage and current, and any combination of electrical loads, may be accommodated through the use of the generator configuration of the invention.

FIG. 6 is a schematic illustration of an open cycle power plant incorporating an MHD generator. Incoming air passes through a compressor 91 which is driven by a prime mover such as a conventional steam turbine 90. Air from compressor 91, at 140 p.s.i. and 500° F., is further heated in regenerative heater 92 by the exhaust gases from a magnetohydrodynamic generator illustrated at 93, and its temperature raised from 500° F. to approximately 3600° F. The preheated air, at 3600° F. and 140 lbs. per square inch pressure, is driven into a combustion chamber 94 where pulverized coal from the bin and automatic feeder 95 is burned to raise the temperature of the gas to approximately 5000° F. The high pressure air from chamber 94 flows into MHD generator 93 and alkali metal seeding material is injected into the heated air stream during this time by an injection nozzle, not shown. The conducting gas passes through the MHD generator and generates a unidirectional or D.C. voltage in the manner previously described. In this process the gas is cooled and the exhaust from generator 93 is at 4000° F. or so. This 4000° F. exhaust gas flows to regenerator 92 and preheats the incoming gas passing through the heating coils 46 in the chamber. This reduces the temperature of the exhaust gas further and it exits from chamber 92 at approximately 2000° F.

The still hot gas then flows through a boiler 97 where the remaining thermal energy is abstracted to provide steam for the conventional steam turbine 90. Steam turbine 90, as explained previously, drives compressor 91 and also generates additional electrical power by driving a conventional A.C. generator 98. Exhaust steam from turbine 90 is passed through suitable coils 99 of steam condenser 100. The condensate produced there flows through steam coil 101 in boiler 97 where the condensate is again converted to steam by the 2000° F. exhaust gases passing through the boiler. The steam is then recirculated to drive turbine 90. In passing through boiler 97 the exhaust gas is cooled from 2000° F. to approximately 300° F. and is exhausted to the atmosphere through a stack 102. It will be apparent that in an open cycle system such as that shown in FIG. 5 the efficiency of the cycle is greatly enhanced by combining the steam turbine 90 with the MHD generator since the energy in the heated exhaust gas from the generator is utilized to generate additional electric power rather than being dissipated by exhausting to atmosphere at 2000° F.

It is to be understood that the MHD generator may be utilized in power plant cycles other than the open cycle system just described. Specifically, a closed cycle system may be utilized wherein a gas other than air is used as the working fluid and is continually recirculated. Such a closed cycle arrangement is particularly effective in connection with a non-combusting heat source. In any event, it will be understood by those skilled in the art that many different heat sources and many diverse operating cycles may be used in conjunction with the MHD generator of this invention in order to produce the most compact, useful, and efficient operation.

FIGS. 7 and 8 illustrate a specific configuration which may be utilized in constructing an MHD channel such as illustrated in FIGS. 3 and 5. In FIG. 7, channel 110 comprises entrance member 111, exit member 112 and channel midsection 113. A vertical cross-sectional view of midsection 113, taken along section lines 8—8, is shown in FIG. 8. Midsection 113 includes a pair of insulating side wall members 114 and 115, and a pair of insulating top and bottom wall members 116 and 117, respectively. Side wall members 114 and 115 are each apertured at regular intervals along the length thereof to provide slots for electrode members 118. Each electrode 118 is held in place by a retaining bolt 119 which is threaded into side wall member 114 and retained securely in place by locking nut 120. If electrode member 118 deteriorates by reaction with the hot gas in the channel, bolt 119 may be threaded inwardly to keep electrode member 118 flush with the inner surface of side wall member 114. This adjustment may be made manually, at intervals, or may be done continuously and automatically at a rate calculated from the rate of deterioration of the electrode members.

Top and bottom wall members 116 and 117 are each spanned by a plurality of conducting metallic bars or straps 121 which extend over the lateral edges of the wall members and are threaded thereat to receive bolts 122. Bolts 122 pass through side wall members and contact metallic plates 123. Straps 121 are aligned to correspond, in space, to the portions of electrode members 118, and are not electrically interconnected except to the corresponding strap on the opposite lateral wall of the channel. They are, however, connected, through bolts 122, plates 123 and bolts 119, to opposed pairs of electrode members 118, and provide an electrical short-circuit to allow for a transverse current to flow through the working fluid of the generator.

As is obvious from a viewing of FIG. 7, the channel is wider at the exit end than at the entrance end to keep the expanding gas constant velocity. To facilitate this widening, side wall members 114 and 115 are tapered. These members are removably secured to the exit and entrance members by longitudinal bolts 124 which may be removed to replace electrode members 119 or perform other repairs. A pair of magnetic pole pieces 125 and 126 are located above and below the fluid flow portion of channel 110 and are used, in conventional fashion, to establish the necessary magnetic field (which is shown by arrow 127 in FIG. 8) to facilitate the generation of electric energy in accord with the invention.

It will be obvious to those skilled in the art that many variations and modifications of the disclosed MHD generator configuration may be made without departing from the spirit and scope of the invention. Therefore, this invention is to be considered as limited only in accordance with the teachings thereof as set forth in the claims appended hereto.

What we claim as new and desire by Letters Patent in the United States is:

1. A magnetohydrodynamic generator comprising, an insulating member defining a rectangular cross-sectioned channel and including top and bottom planar portions and a plurality of pairs of oppositely disposed planar spacer members displaced along the axis of said channel and joining said top and bottom planar portions along the axially extending edges thereof, said channel confining a conducting fluid during its flow therethrough, means providing a magnetic field in said channel having lines of flux transverse to the direction of fluid flow, a plurality of pairs of oppositely disposed electrodes positioned so as to be in contact with the ionized fluid within said channel and spaced along said channel in the direction of fluid flow, said electrodes being separated from each other by said planar spacer members and joined thereto and to said top and bottom planar portions, a plurality of conductive bars extending transversely of said axis and positioned in spaced, electrically insulated relation on one of said planar portions externally of said channel, each of said conductive bars electrically connecting a pair of oppositely disposed electrodes together to provide a plurality of completed electrical circuits for transverse current which is generated by the interaction of the conducting fluid with the magnetic field, and means electrically connecting a load between any two electrode pairs separated in the axial direction.

2. A magnetohydrodynamic generator as recited in claim 1 wherein said one of said planar portions is provided with a plurality of transverse grooves on the surface thereof externally of said channel and said conductive bars are received within said grooves.

3. A magnetohydrodynamic generator as recited in claim 1 wherein there is further provided means for moving each of said oppositely disposed electrodes to maintain said electrodes flush with the inner surface of said spacer members.

4. A magnetohydrodynamic generator comprising an insulating member defining a rectangular cross-sectioned channel and including top and bottom planar portions and a plurality of pairs of oppositely disposed planar spacer members integrally formed with said top and bottom planar portions and extending therebetween for holding said top and bottom planar portions in spaced relation, a plurality of electrically conducting members of rectangular cross-section, two opposed sides of which comprise electrodes and the other two opposed sides of which comprise conducting bars, said conducting bars extending transversely of said axis and positioned in spaced, electrically insulated relation on said top and bottom planar portions externally of said channel for positioning said electrodes intermediate said spacer elements, said electrodes being flush with the inner surface of said spacer elements, said insulating member and said electrodes confining a conducting fluid within said channel during its flow therethrough whereby said conducting fluid contacts said electrodes, means providing a magnetic field in said channel having lines of flux transverse to the direction of flow of said conducting fluid, said magnetic field interacting with said flow of said conducting fluid to generate transverse current in said conducting fluid, said transverse current passing through completed electrical circuits provided by said electrically conducting members, and means electrically connecting a load between any two electrically conducting members separated in the axial direction.

References Cited in the file of this patent
UNITED STATES PATENTS

| | | |
|---|---|---|
| 1,530,468 | Elliott | Mar. 17, 1925 |
| 3,091,709 | Rosa | May 28, 1963 |

FOREIGN PATENTS

| | | |
|---|---|---|
| 841,613 | Germany | June 16, 1952 |
| 1,161,079 | France | Mar. 17, 1958 |